United States Patent
Kokubo

(10) Patent No.: US 10,513,035 B2
(45) Date of Patent: Dec. 24, 2019

(54) ROBOT-DEFECTIVE-PART DIAGNOSING DEVICE AND METHOD

(71) Applicant: FANUC CORPORATION, Yamanashi (JP)

(72) Inventor: Kyouhei Kokubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 206 days.

(21) Appl. No.: 15/635,309

(22) Filed: Jun. 28, 2017

(65) Prior Publication Data
US 2018/0015616 A1    Jan. 18, 2018

(30) Foreign Application Priority Data
Jul. 12, 2016    (JP) ................................ 2016-137368

(51) Int. Cl.
*B25J 9/16*    (2006.01)
(52) U.S. Cl.
CPC ... *B25J 9/1692* (2013.01); *G05B 2219/39045* (2013.01)
(58) Field of Classification Search
CPC ........ B25J 9/1692; B25J 9/1697; B25J 13/08; G05B 2219/39045; Y10S 901/02; Y10S 901/41
(Continued)

(56) References Cited

U.S. PATENT DOCUMENTS

| | | | |
|---|---|---|---|
| 7,161,321 B2* | 1/2007 | Ban ........................ | B25J 9/1692 318/560 |
| 7,532,949 B2* | 5/2009 | Ban ........................ | B25J 19/023 345/419 |

(Continued)

FOREIGN PATENT DOCUMENTS

CN    101100061 A    1/2008
EP    1875991 A2    1/2008
(Continued)

OTHER PUBLICATIONS

Japanese Office Action dated Apr. 24, 2018, for Japanese Patent Application No. 2016-137368.
(Continued)

*Primary Examiner* — Dalena Tran
(74) *Attorney, Agent, or Firm* — Karceski IP Law, PLLC

(57) ABSTRACT

A robot-defective-part diagnostic device includes a position measuring unit with a target and a sensor for capturing an image of the target. One of the target and the sensor is attached to the robot and the other is disposed outside the robot. The position measuring unit measures the positions of the target with the sensor for postures of the robot. The device also includes an error calculation unit that calculates the positioning error based on the measured positions of the target. A parameter calculation unit that calculates the mechanical parameters of the respective operation shafts based on the measured positions of the target for the respective postures when the calculated positioning error is larger than a predetermined threshold, and a defective-part identifying unit that identifies the operation shaft where the difference between the calculated mechanical parameters and preset mechanical parameters for achieving the postures is the largest.

4 Claims, 6 Drawing Sheets

(58) Field of Classification Search
USPC ........ 700/254, 245, 175, 42; 901/2; 382/128
See application file for complete search history.

(56) References Cited

U.S. PATENT DOCUMENTS

2008/0004750 A1    1/2008   Ban et al.
2015/0273692 A1   10/2015   Ogawara

FOREIGN PATENT DOCUMENTS

| JP | S62049513 | 3/1987 |
| JP | H05008185 | 1/1993 |
| JP | H08-174453 | 7/1996 |
| JP | 2008-012604 | 1/2008 |
| JP | 2015199192 | 11/2015 |

OTHER PUBLICATIONS

Chinese Office Action dated Sep. 11, 2019, for Chinese Patent Application No. 201710497357.9.

* cited by examiner

ROBOT-DEFECTIVE-PART DIAGNOSING DEVICE AND METHOD

CROSS-REFERENCE TO RELATED APPLICATIONS

This application is based on and claims priority to Japanese Patent Application No. 2016-137368, filed on Jul. 12, 2016, the entire content of which is incorporated herein by reference.

FIELD OF THE INVENTION

The present invention relates to a robot-defective-part diagnosing device and method.

BACKGROUND OF THE INVENTION

Conventionally, a device and a method for measuring and correcting a positioning error of a robot are known, for example, as described in Japanese Unexamined Patent Application, Publication No. Hei 8-174453.

In this device and method, a target is disposed on one of a table and the distal end of a robot, and a measuring device is disposed on the other, and, by obtaining a link parameter error from the distance to the target, measured by the measuring device, and a robot's operation instruction value, a positioning error of the distal end of the robot is estimated.

SUMMARY OF THE INVENTION

The present invention provides the following solutions.

An aspect of the present invention provides a robot-defective-part diagnostic device comprising: a position measuring unit including a target and a sensor for capturing an image of the target, one of the target and the sensor being attached to a robot and the other being disposed outside the robot, the position measuring unit measuring positions of the target with the sensor for a plurality of postures of the robot; an error calculation unit that calculates a positioning error of the robot on the basis of the positions of the target measured by the position measuring unit; a parameter calculation unit that calculates mechanical parameters of respective operation shafts of the robot on the basis of the positions of the target measured by the position measuring unit for the respective postures when the positioning error calculated by the error calculation unit is larger than a predetermined threshold; and a defective-part identifying unit that identifies, as a causal part, the operation shaft in which the difference between the mechanical parameters calculated by the parameter calculation unit and preset mechanical parameters for achieving the respective postures is the largest.

Another aspect of the present invention provides a robot defective-part diagnostic method including: a position measuring step in which one of a target and a sensor for capturing an image of the target is attached to a robot and the other is disposed outside the robot, and positions of the target are measured with the sensor for a plurality of postures of the robot; an error calculation step in which a positioning error of the robot is calculated on the basis of the positions of the target measured in the position measuring step; an error determination step in which it is determined whether the positioning error calculated in the error calculation step is larger than a predetermined threshold; a parameter calculation step in which, when it has been determined that the positioning error is larger than the threshold in the error determination step, mechanical parameters of the respective operation shafts of the robot are calculated on the basis of the positions of the target measured for the respective postures in the position measuring step; and a defective-part identifying step in which the operation shaft having the largest difference between the mechanical parameters calculated in the parameter calculation step and preset mechanical parameters for achieving the respective postures is identified as a causal part.

DESCRIPTION OF EMBODIMENT(S) OF THE INVENTION

A robot-defective-part diagnostic device 1 and method according to an embodiment of the present invention will be described below with reference to the drawings.

Figure 1:
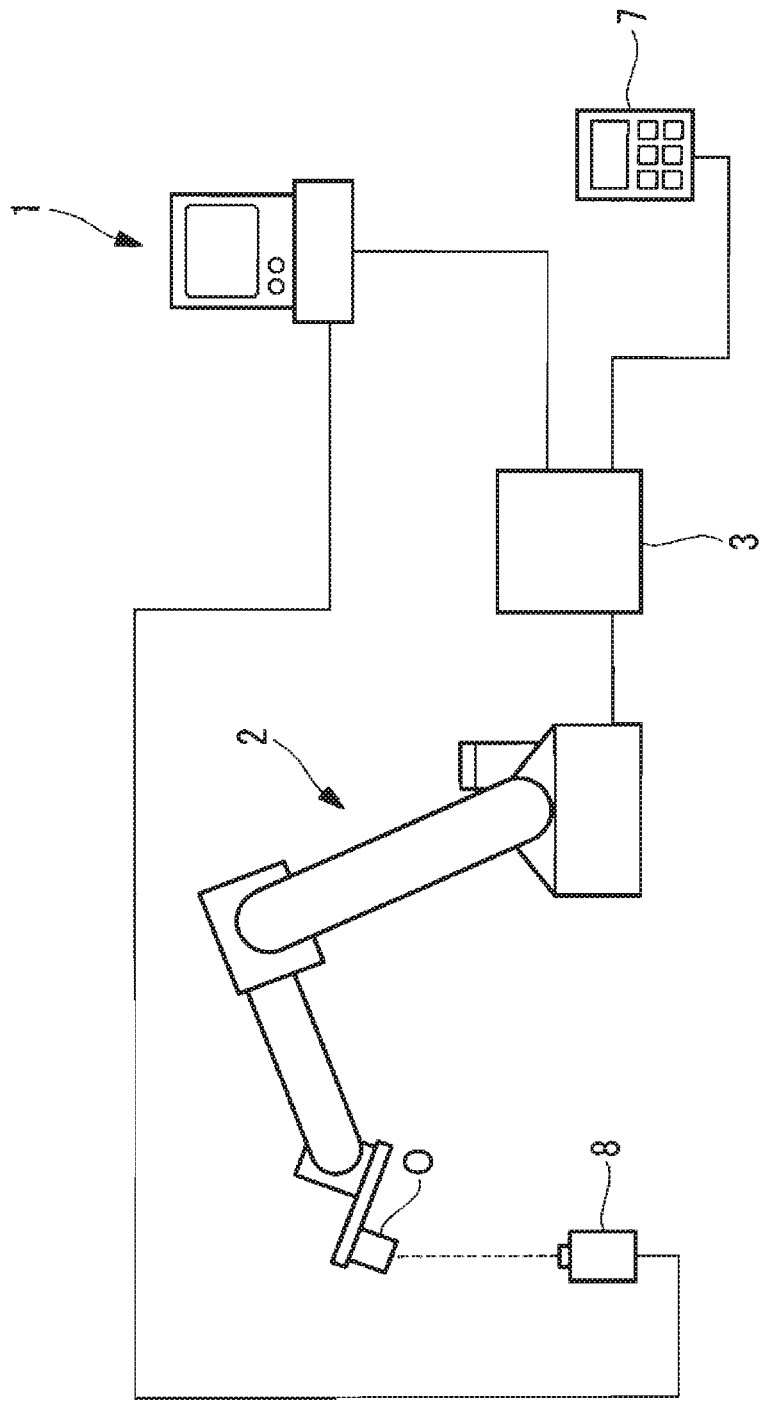
FIG. 1 is a diagram showing the overall configuration of a robot system provided with a robot-defective-part diagnostic device according to an embodiment of the present invention.
Figure 2:
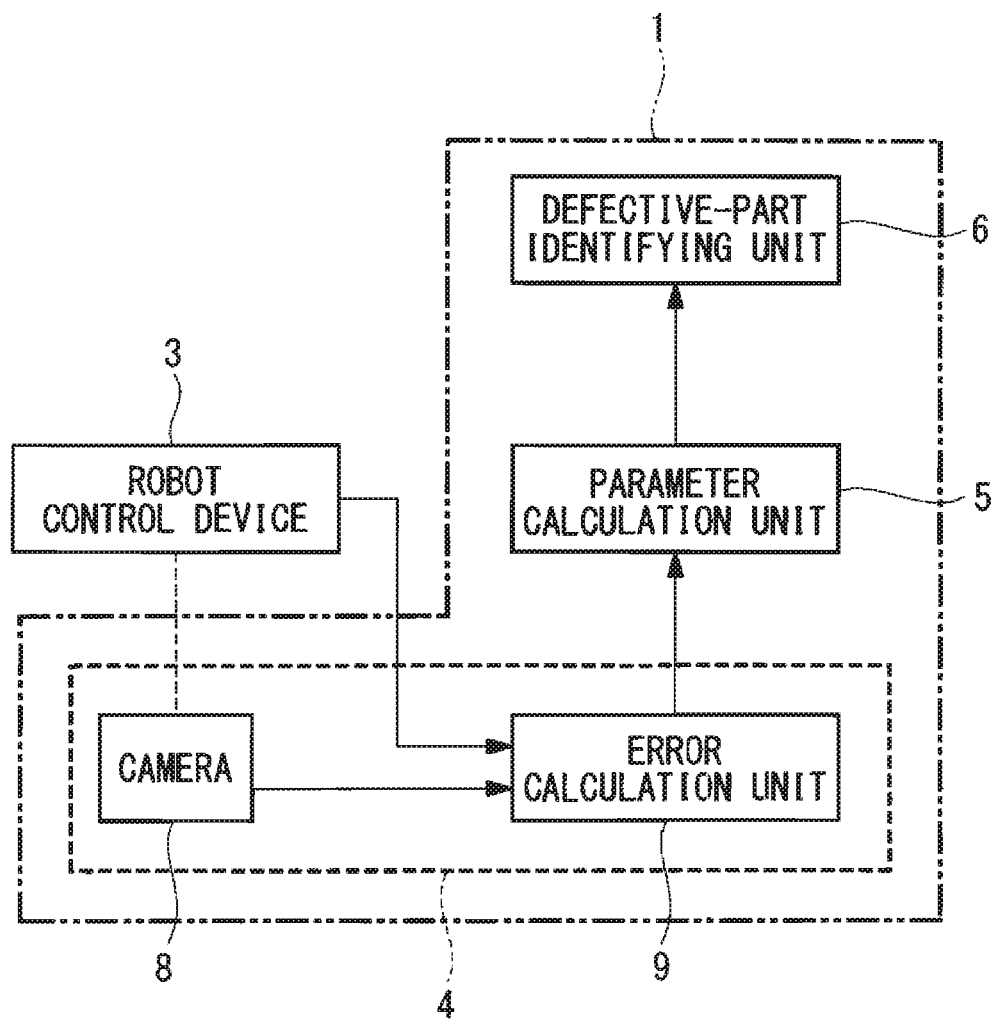
FIG. 2 is a block diagram showing the robot-defective-part diagnostic device in FIG. 1.

As shown in FIGS. 1 and 2, the robot-defective-part diagnostic device 1 according to this embodiment is provided in a robot system including a robot 2 and a robot control device 3 for controlling the operation of the robot 2 and includes: an error measuring unit 4 that measures a positioning error of the robot 2; a parameter calculation unit 5 that calculates the mechanical parameters of respective operation shafts when the positioning error measured by the error measuring unit 4 is larger than a predetermined threshold; and a defective-part identifying unit 6 that identifies the part that causes the large positioning error by using the mechanical parameters calculated by the parameter calculation unit 5. In FIG. 1, reference sign 7 denotes a teaching operation panel.

As shown in FIGS. 1 and 2, the error measuring unit 4 includes a target O fixed to the distal end of the robot 2, a camera (sensor, position measuring unit) 8 fixed outside the robot 2 (for example, on the floor), at a position where it can capture an image of the target, and an error calculation unit 9 that calculates a positioning error on the basis of the information about the positions of the respective operation shafts of the robot 2 obtained from the robot control device 3 and image information captured by the camera 8.

More specifically, the error calculation unit 9 calculates the positions of the target O on the basis of the angles, obtained by encoders provided on motors of the respective operation shafts, detected when the robot 2 assumes a predetermined number, N, of measuring postures, calculates the positional relationship between the target O and the camera 8 on the basis of the images captured by the camera 8, and calculates the installation position of the camera 8 for each of the N measuring postures on the basis of the calculated positions of the target O and the positional relationship between the target O and the camera 8. Then, the error calculation unit 9 calculates the standard deviation $\sigma_0$ of the calculated number, N, of installation positions of the camera 8 as a positioning error.

The parameter calculation unit 5 determines whether or not the standard deviation $\sigma_0$ of the N installation positions of the camera 8 is larger than a predetermined threshold $\varepsilon$. When the standard deviation $\sigma_0$ is larger than the threshold $\varepsilon$, it is determined that there is a part that needs to be replaced. When the standard deviation $\sigma_0$ is less than or equal to the threshold $\varepsilon$, it is determined that there is no part that needs to be replaced.

When it is determined that there is a part that needs to be replaced, the parameter calculation unit 5 calculates the mechanical parameters of the robot 2 for each of the N measuring postures by a known method, using the N installation positions of the camera 8 calculated by the error measuring unit 4. Examples of the known methods include, for example, a method disclosed in R. Bernhardt, "Robot Calibration" KLUWER ACADEMIC PUBLISHERS, ISBN 0-412-49140-0, or a method disclosed in Hanqi Zhuang and Zvi S. Roth, "Camera-Aided Robot Calibration", CRC Press. In this case, all the mechanical parameters that cause the large positioning error are listed.

Examples of the mechanical parameters include DH parameters that show the geometrical states of the respective links of the robot 2, and parameters handled in calibration, such as spring constants, for correcting the deflection of the robot 2.

Herein, to simplify the explanation, it is assumed that all the operation shafts of the robot 2 are rotary shafts that relatively rotate the links, and DH parameters (d, a, $\theta$, $\alpha$) of each operation shaft are used as the mechanical parameters. Herein, d is the distance between the links, a is the distance between the operation shafts, $\theta$ is the angle between the links, and $\alpha$ is the torsion angle between the links. It is also assumed that the number of mechanical parameters, L, that cause a large positioning error is equal to the number of operation shafts of the robot 2.

From among the mechanical parameters of the respective operation shafts, calculated for each of the N measuring postures by the parameter calculation unit 5, the defective-part identifying unit 6 detects a mechanical parameter having the largest difference in absolute value relative to the preset values for achieving the respective measuring postures, so as to identify a part near the operation shaft to which the detected mechanical parameter belongs as a part that needs to be replaced.

A defective-part diagnostic method using the thus-configured robot-defective-part diagnostic device 1 according to this embodiment will be described below.

Figure 3:
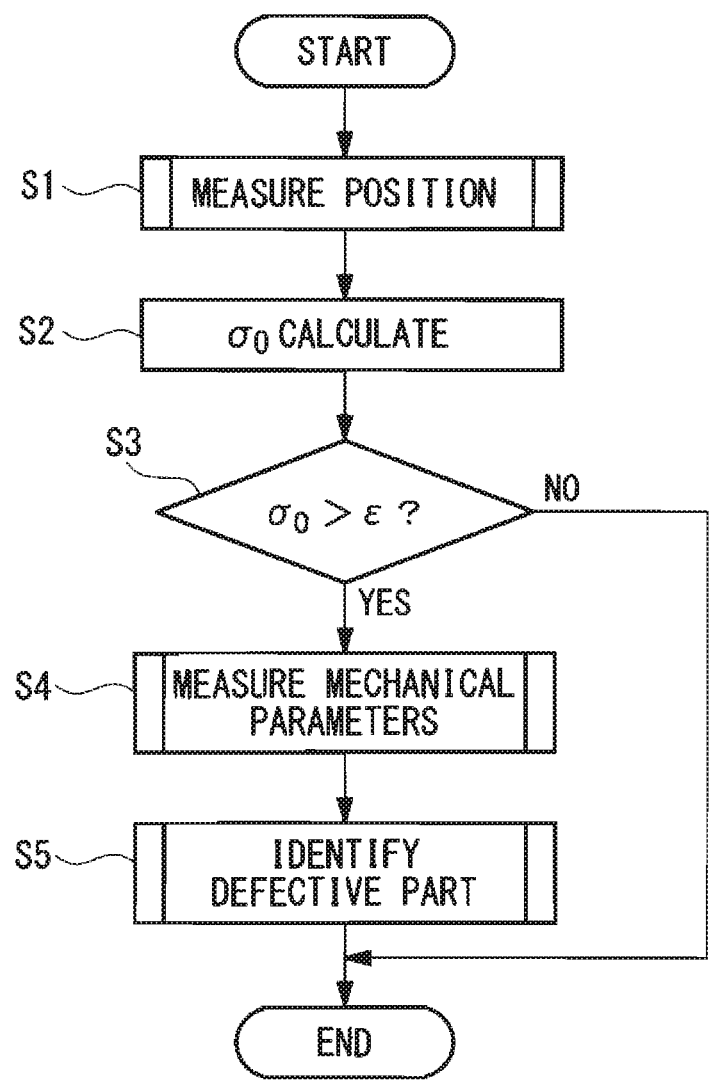
FIG. 3 is a flowchart for explaining a defective-part diagnostic method using the robot-defective-part diagnostic device in FIG. 1.

As shown in FIG. 3, the defective-part diagnostic method according to this embodiment includes: a position measuring step S1 in which the installation positions of the camera 8 are measured; an error calculation step S2 in which the standard deviation $\sigma_0$ of the installation positions of the camera 8 is calculated; a determination step (error determination step) S3 in which it is determined whether the standard deviation $\sigma_0$ is greater than a predetermined threshold $\varepsilon$ is determined; a parameter calculation step S4 in which, when it has been determined that the standard deviation $\sigma_0$ is greater than the predetermined threshold $\varepsilon$, the mechanical parameters are calculated; and a defective-part identifying step S5 in which a defective part is identified on the basis of the calculated mechanical parameters.

Figure 4:
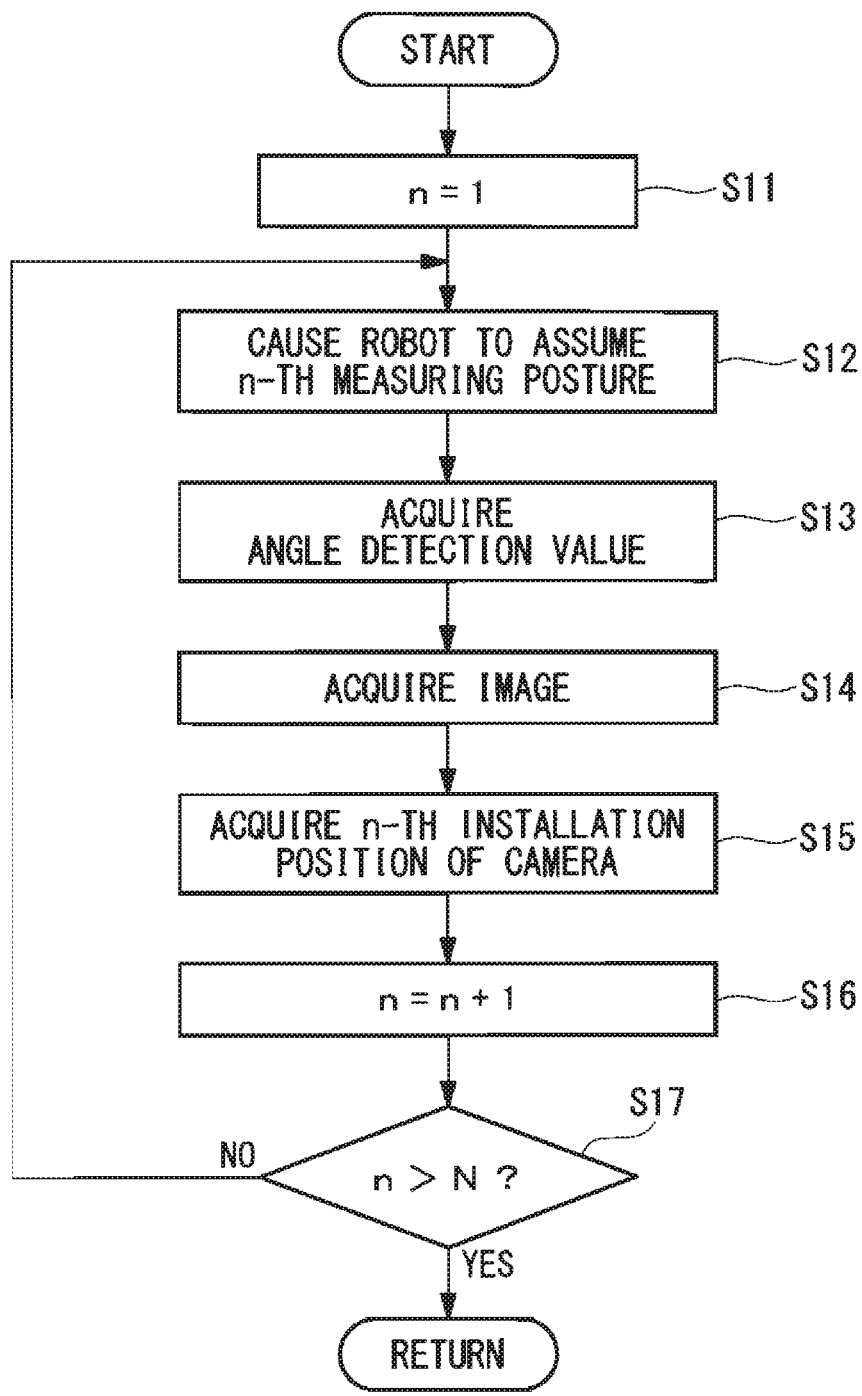
FIG. 4 is a flowchart for explaining a position measuring step in the defective-part diagnostic method in FIG. 3.

As shown in FIG. 4, in the position measuring step S1, a value n is initialized (step S11), the robot 2 is set to assume the n-th measuring posture (step S12), the angle detection values of the motors of the respective operation shafts are acquired from the encoders (step S13), an image of the target O is captured with the camera 8 (step S14), the installation position of the n-th camera 8 is calculated (step S15), the value n is incremented (step S16), and it is determined whether the value n is greater than N (step S17). When the value n is less than or equal to N, the process from step S12 is repeated.

Figure 5:
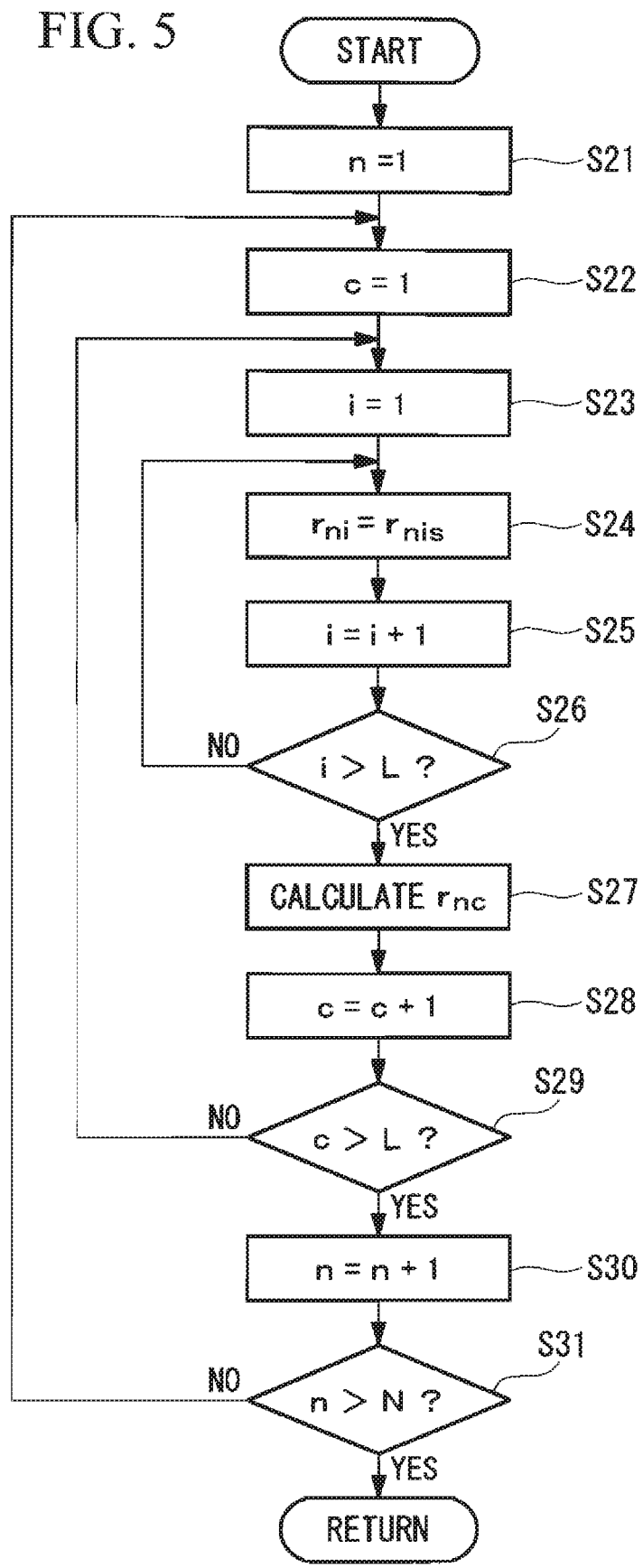
FIG. 5 is a flowchart for explaining a mechanical-parameter calculation step in the defective-part diagnostic method in FIG. 3.

As shown in FIG. 5, in the parameter calculation step S4, the value n is initialized (step S21), and the value c is initialized (step S22). The preset mechanical parameters $Rns = (rn1s, rn2s, \ldots, rnLs)$ of the respective operation shafts for achieving the n-th measuring posture are known, and the mechanical parameters of all the operation shafts are set to the preset values (step S23 to S26). Then, only the mechanical parameter $r_{nc}$ of the c-th operation shaft is obtained by reverse calculation from the position of the target O in the n-th measuring posture, measured by the camera 8 in the position measuring step S1 (step S27).

Then, the value c is incremented (step S28), and it is determined whether the value c is greater than L (step S29). When the value c is less than or equal to L, the process from step S23 is repeated. Conversely, when the value c is greater than L, the value n is incremented (step S30), and it is determined whether the value n is greater than N (step S31). When the value n is less than or equal to N, the process from step S22 is repeated.

As a result, for each of the N measuring postures, L mechanical parameters are generated, in which only one of the mechanical parameters is calculated from the image captured by the camera 8, and the remaining mechanical parameters are set to the preset values.

Figure 6:
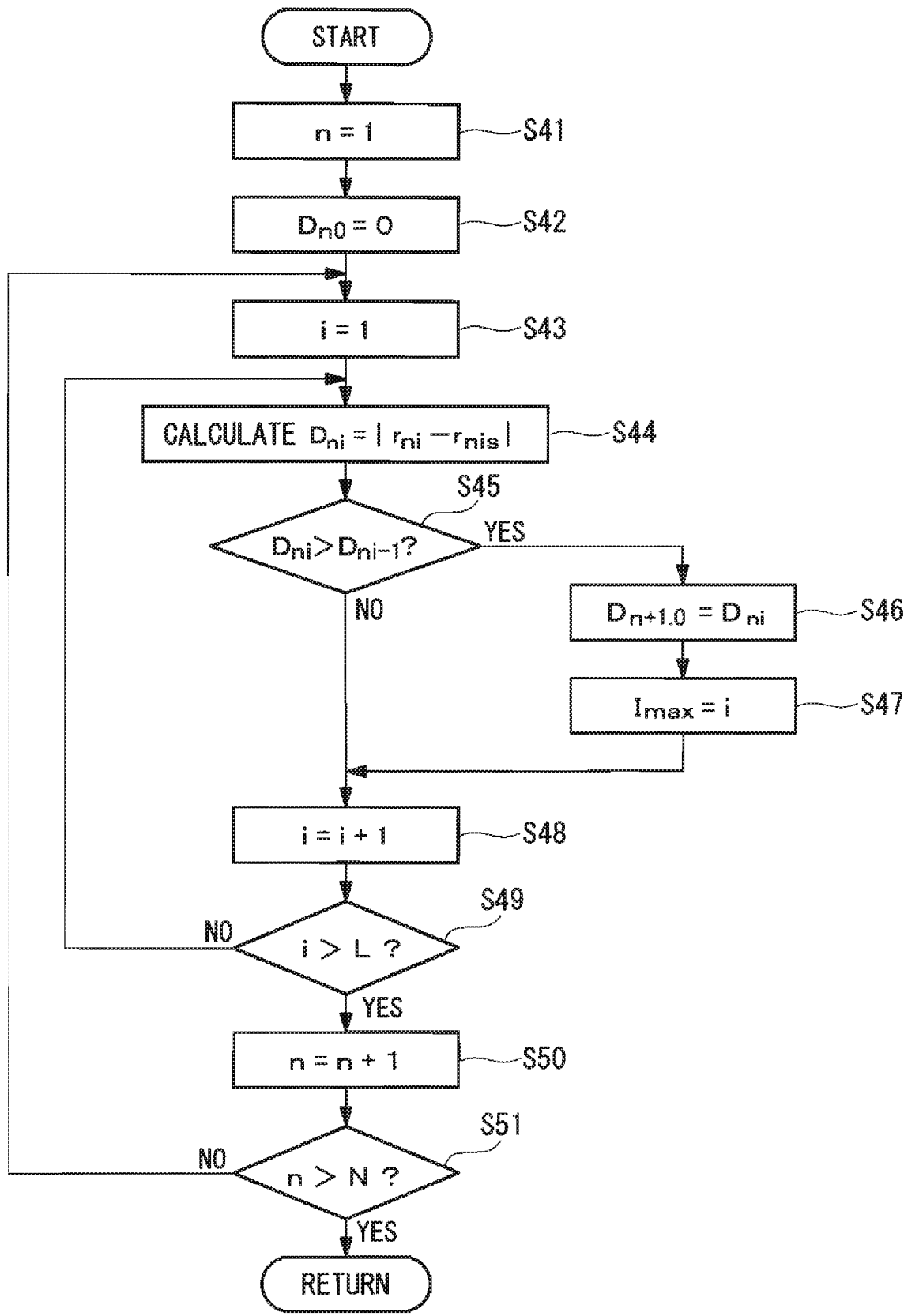
FIG. 6 is a flowchart for explaining a defective-part identifying step in the defective-part diagnostic method in FIG. 3.

As shown in FIG. 6, in the defective-part identifying step S5, the value n is initialized (step S41), $D_{n0}$ is set to 0 (step S42), and the value i is initialized (step S43). Then, in step S27, the absolute value $D_{ni}$ of the difference between the calculated mechanical parameter $r_{ni}$ and the corresponding preset value $r_{nis}$ is calculated (step S44).

It is determined (step S45) whether the calculated absolute value $D_{ni}$ of the difference is greater than the absolute value $D_{ni-1}$ of the immediately previous difference. When the absolute value $D_{ni}$ is greater than the absolute value $D_{ni-1}$, the absolute value $D_{ni}$ of the difference is stored as the initial value $D_{n+1,0}$ for the next loop (step S46), and $I_{max}$ is set to a value i (step S47). The value i is incremented (step S48), and it is determined whether the value i is greater than L (step S49). When the value i is less than or equal to L, the process from step S44 is repeated. When the value i is greater than L, the value n is incremented (step S50), and it is determined whether the value n is greater than N (step S51). When the value n is less than or equal to N, the process from step S43 is repeated.

As a result, the shaft number, $I_{max}$, in which the absolute value of the difference of the mechanical parameter is largest is identified. More specifically, when the mechanical parameter calculated from the actual position of the target O captured by the camera 8 significantly deviates from the preset value for making the robot 2 assume that measuring posture, it can be identified as the operation shaft in which the defective part exists.

In this way, according to the robot-defective-part diagnostic device 1 and method according to this embodiment, when the positioning error of the robot 2 is large, it is possible to easily identify the operation shaft (causal part)

having the part that mainly causes a large positioning error and thus needs to be replaced. Accordingly, there is an advantage in that it is possible to prevent the inconvenience of having to dispatch a part that needs to be replaced after the positioning error is brought into a predetermined range by calibration.

Note that, in this embodiment, although the error measuring unit 4 includes the target O fixed at the distal end of the robot 2 and the camera 8 fixed outside the robot 2, it is also possible to provide the camera 8 at the distal end of the robot 2 and the target O outside the robot 2.

Furthermore, in this embodiment, although the defective-part identifying unit 6 detects a mechanical parameter, among the mechanical parameters of the respective operation shafts calculated for each of the N measuring postures, whose difference in absolute value relative to the standard value is largest to identify a part near the operation shaft to which the detected mechanical parameter belongs as the part that needs to be replaced, the part may be identified by the method described below.

Specifically, as in the flowchart in FIG. 5, it is possible that the installation positions of the camera 8 are calculated by using the mechanical parameter of only a specific operation shaft, obtained by reverse calculation from the positions of the target O in the N measuring postures measured by the camera 8, the standard deviation thereof is calculated, and the operation shaft (determination shaft) in which the calculated standard deviation is smallest is identified as the operation shaft (causal part) having the part that mainly causes a large positioning error and thus needs to be replaced.

Furthermore, in this embodiment, although DH parameters have been shown as an example of mechanical parameters, instead, other arbitrary mechanical parameters may be employed. In that case, to enable comparison of the magnitude of the difference relative to the preset value between mechanical parameters having different units, an appropriate scale of the units may be set in advance so that the values can be compared with one another as they are.

As a result, the above-described embodiment leads to the following aspects.

An aspect of the present invention provides a robot-defective-part diagnostic device comprising: a position measuring unit including a target and a sensor for capturing an image of the target, one of the target and the sensor being attached to a robot and the other being disposed outside the robot, the position measuring unit measuring positions of the target with the sensor for a plurality of postures of the robot; an error calculation unit that calculates a positioning error of the robot on the basis of the positions of the target measured by the position measuring unit; a parameter calculation unit that calculates mechanical parameters of respective operation shafts of the robot on the basis of the positions of the target measured by the position measuring unit for the respective postures when the positioning error calculated by the error calculation unit is larger than a predetermined threshold; and a defective-part identifying unit that identifies, as a causal part, the operation shaft in which the difference between the mechanical parameters calculated by the parameter calculation unit and preset mechanical parameters for achieving the respective postures is the largest.

According to this aspect, in a state in which one of the target and the sensor is attached to the robot and the other is disposed outside the robot, and the robot is positioned in a plurality of predetermined measuring postures, the positions of the target are measured with the sensor of the position measuring unit, and a positioning error of the robot is calculated on the basis of the positions of the target measured by the error calculation unit. When the positioning error of the robot is larger than a predetermined threshold, the presence of any inconvenience in the components of the robot is highly possible. Hence, the component having the inconvenience needs to be identified.

Thus, the parameter calculation unit calculates the mechanical parameters of the respective operation shafts of the robot, for the respective postures of the robot, on the basis of the positions of the target measured by the position measuring unit, and the defective-part identifying unit identifies, as a causal part, the operation shaft in which the difference between the calculated values and the preset values is largest. As a result, the presence of a defective part near the identified operation shaft is easily indicated, and thus, a measure, such as replacement of the part, can be easily taken.

In the above aspect, the defective-part identifying unit may calculate the positioning error of the robot by using the mechanical parameter calculated by the parameter calculation unit for one of the operation shafts, serving as a determination shaft, and using the preset mechanical parameters for the other operation shafts and identify, as the causal part, the determination shaft in which the calculated positioning error is minimum.

With this configuration, when the positioning error is calculated by using the mechanical parameters of the respective operation shafts, obtained from the results of measurement performed by the sensor for the respective postures of the robot, one-by-one as the mechanical parameter of the determination shaft and by setting the remaining operation shafts to the preset mechanical parameters, a determination shaft in which the positioning error is minimum is identified as a causal part.

More specifically, when the mechanical parameters of all the operation shafts are set to the preset values for achieving the respective postures, when the positioning error is increased due to a defect in any of the parts, only the mechanical parameter of the operation shaft corresponding to the defective part is set to the mechanical parameter obtained from the result of measurement performed by the sensor. By doing so, the calculated positioning error can be significantly reduced. Accordingly, by identifying such an operation shaft as the causal part, the part that needs to be replaced can be more accurately identified.

Another aspect of the present invention provides a robot defective-part diagnostic method including: a position measuring step in which one of a target and a sensor for capturing an image of the target is attached to a robot and the other is disposed outside the robot, and positions of the target are measured with the sensor for a plurality of postures of the robot; an error calculation step in which a positioning error of the robot is calculated on the basis of the positions of the target measured in the position measuring step; an error determination step in which it is determined whether the positioning error calculated in the error calculation step is larger than a predetermined threshold; a parameter calculation step in which, when it has been determined that the positioning error is larger than the threshold in the error determination step, mechanical parameters of the respective operation shafts of the robot are calculated on the basis of the positions of the target measured for the respective postures in the position measuring step; and a defective-part identifying step in which the operation shaft having the largest difference between the mechanical parameters calculated in the parameter calculation step and preset mechanical parameters for achieving the respective postures is identified as a causal part.

In the above aspect, in the defective-part identifying step, the positioning error of the robot may be calculated by using the mechanical parameter calculated for one of the operation shafts, serving as a determination shaft, in the parameter calculation step and using the preset mechanical parameters for the other operation shafts, and the determination shaft in which the calculated positioning error is minimum may be identified as the causal part.

The present invention provides an advantage in that it is possible to easily identify the position of a part to be replaced when there is a large positioning error.

The invention claimed is:

1. A robot-defective-part diagnostic device, comprising:
   a processor comprising hardware, the processor being configured to:
   measure positions of a target with a sensor to capture an image of the target, for a plurality of postures of a robot, one of the target and the sensor being attached to the robot and the other being disposed outside the robot;
   calculate a positioning error of the robot based on the measured positions of the target;
   determine whether the calculated positioning error is larger than a predetermined threshold;
   in response to determining that the calculated positioning error is larger than the predetermined threshold, calculate mechanical parameters of respective operation shafts of the robot based on the measured positions of the target for the respective postures; and
   identify, as a causal part, the operation shaft in which a difference between the calculated mechanical parameters and preset mechanical parameters for achieving the respective postures is the largest.

2. The robot-defective-part diagnostic device according to claim 1, wherein the identifying of the operation shaft calculates the positioning error of the robot by using the calculated mechanical parameters for one of the operation shafts, serving as a determination shaft, and using the preset mechanical parameters for the other operation shafts, and identifies, as the causal part, the determination shaft in which the calculated positioning error is minimum.

3. A robot defective-part diagnostic method, comprising:
   measuring positions of a target with a sensor to capture an image of the target, for a plurality of postures of a robot, one of the target and the sensor being attached to the robot and the other being disposed outside the robot;
   calculating a positioning error of the robot on a basis of the measured positions of the target;
   determining whether the calculated positioning error is larger than a predetermined threshold;
   in response to determining that the calculated positioning error is larger than the predetermined threshold, calculating mechanical parameters of the respective operation shafts of the robot on a basis of the measured positions of the target for the respective postures; and
   identifying, as a casual part, the operation shaft in which a difference between the calculated mechanical parameters and preset mechanical parameters for achieving the respective postures is the largest.

4. The robot defective-part diagnostic method according to claim 3, wherein the identifying of the operational shaft calculates the positioning error of the robot by using the calculated mechanical parameters for one of the operation shafts, serving as a determination shaft, and by using the preset mechanical parameters for the other operation shafts, and identifies, as the causal part, the determination shaft in which the calculated positioning error is minimum.

* * * * *